US 8,121,552 B2

(12) United States Patent
Agami et al.

(10) Patent No.: US 8,121,552 B2
(45) Date of Patent: Feb. 21, 2012

(54) METHOD AND APPARATUS FOR PROVIDING CHANNEL QUALITY FEEDBACK IN A WIRELESS COMMUNICATION SYSTEM

(75) Inventors: Gregory M. Agami, Arlington Heights, IL (US); Saten D. Barve, Palatine, IL (US); Jiangnan Jason Chen, Hawthorn Woods, IL (US); Prachi P. Kumar, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1336 days.

(21) Appl. No.: 11/469,983

(22) Filed: Sep. 5, 2006

(65) Prior Publication Data

US 2008/0057969 A1 Mar. 6, 2008

(51) Int. Cl.
 *H04B 17/00* (2006.01)
(52) U.S. Cl. .............. 455/67.11; 455/226.1; 455/63.3; 370/344; 370/468
(58) Field of Classification Search .............. 455/450, 455/67.11; 370/395.4
See application file for complete search history.

(56) References Cited

U.S. PATENT DOCUMENTS

| 2005/0111429 A1* | 5/2005 | Kim et al. ............... 370/344 |
| 2005/0170782 A1* | 8/2005 | Rong et al. .............. 455/67.11 |
| 2005/0191965 A1 | 9/2005 | Yu et al. |
| 2005/0201296 A1 | 9/2005 | Vannithamby et al. |
| 2007/0086468 A1* | 4/2007 | Hosein et al. ............ 370/395.4 |
| 2010/0144282 A1* | 6/2010 | Laroia et al. ............. 455/63.3 |

OTHER PUBLICATIONS

Das, Arnab et al: "A Variable Rate Channel Quality Feedback Scheme for 3G Wireless Packet Data Systems", Proceedings of the IEEE Communications Conference, May 2003, 0-7803-7802-4/03, pp. 982-986.
Muller, Andreas et al.: "Improving HSDPA Link Adaptation by Considering the Age of Channel Quality Feedback Information", Vehicular Technology Conference, Sep. 2005, 0-7803-9152-7/05, pp. 1643-1647.

\* cited by examiner

*Primary Examiner* — Phuoc Doan
(74) *Attorney, Agent, or Firm* — Steven A. May

(57) ABSTRACT

A wireless communication system that provides periodic channel quality feedback adjusts a channel condition reporting period for a subscriber station based on the multiple channel condition information reports, such as CQI messages, received from the subscriber station.

21 Claims, 8 Drawing Sheets

|          | SLOT 0  | SLOT 1  | SLOT 2   | SLOT 3  |
|----------|---------|---------|----------|---------|
| FRAME 0  | UE 101  | UE 102  | UE 103   | UE 104  |
| FRAME 1  | UE 101  | UE 105  | UE 106   | UE 107  |
| FRAME 2  | UE 101  | UE 102  | UE 108   | UE 109  |
| FRAME 3  | UE 101  | UE 105  | UE 110   | UE 111  |
| FRAME 4  | UE 101  | UE 102  | UE 103   | UE 112  |
| FRAME 5  | UE 101  | UE 105  | UE 106   | UE 113  |
| FRAME 6  | UE 101  | UE 102  | UE 108   | UE 114  |
| FRAME 7  | UE 101  | UE 105  | UE 110   | UE 115  |
| FRAME 8  | UE 101  | UE 102  | UE 103   | UE 104  |
| FRAME 9  | UE 101  | UE 105  | UE 1016  | UE 107  |

METHOD AND APPARATUS FOR PROVIDING CHANNEL QUALITY FEEDBACK IN A WIRELESS COMMUNICATION SYSTEM

FIELD OF THE INVENTION

The present invention relates generally to wireless communication systems, and, in particular, to an exchange of channel quality information in a wireless communication system providing periodic channel quality feedback.

BACKGROUND OF THE INVENTION

The IEEE (Institute of Electrical and Electronics Engineers) 802.16 standards propose using an Orthogonal Frequency Division Multiple Access (OFDMA) for transmission of data over an air interface. OFDMA has also been proposed for use in 3GPP (Third Generation Partnership Project) Evolution communication systems. In an OFDMA communication system, a frequency bandwidth is split into multiple frequency subcarriers that comprise the physical layer channels over which traffic and signaling channels are transmitted in a TDM or TDM/FDM fashion. A user may then be assigned one or more of the frequency subcarriers for an exchange of bearer information, thereby permitting multiple users to transmit simultaneously on the different set of subcarriers such that each user's transmission is orthogonal to the other users transmissions and thus intra-cell interference is minimized.

In order to maximize bandwidth usage, OFDMA communication systems often engage in frequency selective scheduling. That is, for any given radio frame, the subcarriers may be allocated to users based on measured channel conditions. Alternatively, individual subcarriers across the entire bandwidth may be assigned to users so that a user can report an average CQI across all of its assigned subcarriers. Further, an appropriate modulation scheme and coding scheme may be determined for each subcarrier and each radio frame based on the measured channel conditions. The channel condition measurements are performed by a subscriber station (SS), which SS measures channel conditions for each assigned subcarrier or alternatively averages all its assigned subcarriers during a measuring period, such as a radio frame transmission period, and then reports the measured channel conditions for all of the subcarriers to a serving Node B in a Channel Quality Information (CQI) message. The CQI messages are conveyed at a fixed periodicity, or rate, typically every 8 frames, that is, every 40 milliseconds (ms).

Based on the reported CQIs, an OFDMA communication system selectively schedules the subcarriers each radio frame and further adaptively determines appropriate modulation and coding schemes for each subcarrier during the scheduling period. Reporting a CQI at a fixed periodicity may consume a significant amount of uplink system overhead, especially when there are a large number of reporting subscriber stations (SSs). In order to conserve bandwidth, it has been proposed that an SS report a CQI only when the CQI is above a threshold or is below another threshold, in effect, turning the CQI feedback channel on and off. However, such a proposal does not provide a base station scheduler with the CQI precision required to make optimal scheduling choices.

Therefore, a need exists for a method and apparatus that provides channel quality information that provides a balance between reducing CQI overhead and providing the CQI precision and reliability required to make optimal scheduling choices.

BRIEF DESCRIPTION OF THE DRAWINGS

FIG. 9 is an exemplary channel condition reporting schedule table in accordance with an embodiment of the present invention.

DETAILED DESCRIPTION OF THE INVENTION

To address the need for a method and an apparatus that provides channel quality information that provides a balance between reducing Channel Quality Information (CQI) overhead and providing the CQI precision and reliability required to make optimal scheduling choices, a wireless communication system that provides periodic channel quality feedback adjusts a channel condition reporting period for a subscriber station based on the multiple channel condition information reports, such as CQI messages, received from the subscriber station.

Generally, an embodiment of the present invention encompasses a method for adjusting a channel condition reporting period in a wireless communication system. The method includes receiving multiple channel condition information reports from a subscriber station based on a channel condition reporting period and adjusting the channel condition reporting period for the subscriber station based on the multiple received channel condition information reports to produce an adjusted channel condition reporting period.

Another embodiment of the present invention encompasses a base station that is configured to control a channel condition reporting period in a wireless communication system, wherein the base station comprises a processor that is configured to receive multiple channel condition information reports from a subscriber station based on a channel condition reporting period and adjust the channel condition reporting period for the subscriber station based on the multiple received channel condition information reports to produce an adjusted channel condition reporting period.

Yet another embodiment of the present invention encompasses a subscriber station that is configured to convey multiple channel condition information reports to a base station based on a first channel condition reporting period, in response to conveying the plurality of channel condition information reports, receive information concerning a second channel condition reporting period that is different than the first channel condition reporting period, and, in response to receiving the information concerning the second channel condition reporting period, convey a channel condition report based on the second channel condition reporting period.

Figure 1:
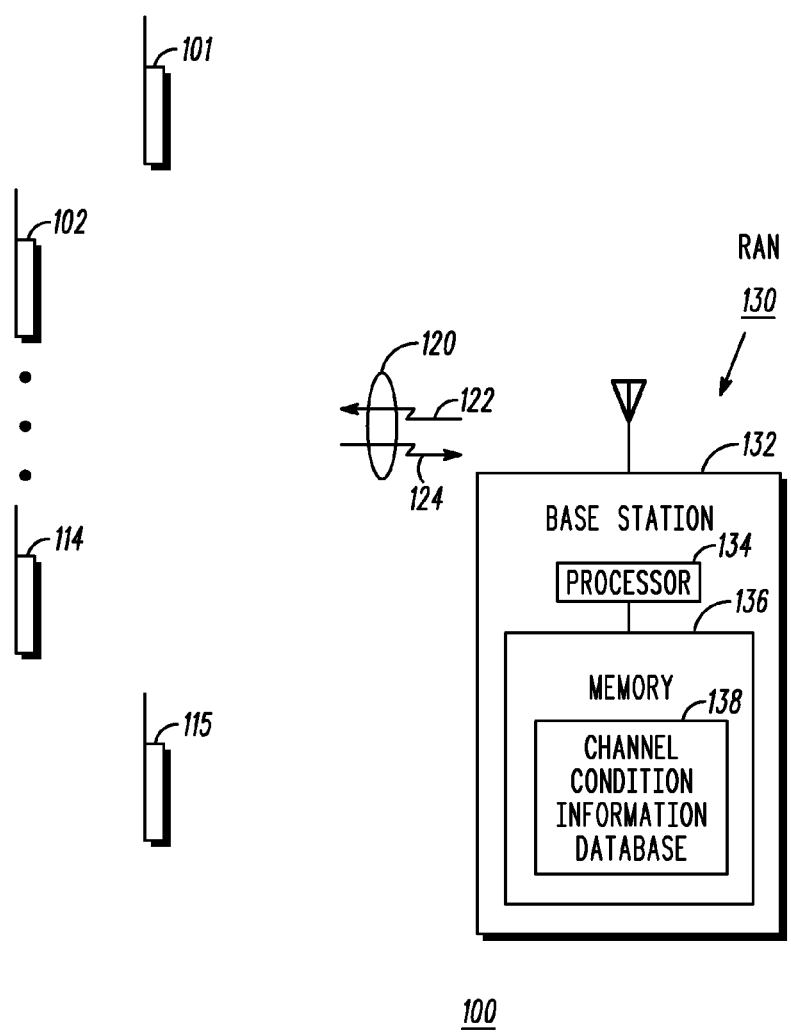
FIG. 1 is a block diagram of a wireless communication system in accordance with an embodiment of the present invention.

The present invention may be more fully described with reference to FIGS. 1-10. FIG. 1 is a block diagram of a wireless communication system 100 in accordance with an embodiment of the present invention. Communication system 100 includes multiple subscriber stations (SSs) 101-115, such as but not limited to a cellular telephone, a radio telephone, a personal digital assistant (PDA) with radio frequency (RF) capabilities, or a wireless modem that provides RF access to digital terminal equipment (DTE) such as a laptop computer. Communication system 100 further includes a radio access network (RAN) 130 that comprises a radio base station 132, such as an Access Point, aNode B, or a Base Transceiver Station (BTS), that provides wireless communication services to each of SSs 101-115 via an air interface 120.

Base station 132 includes a processor 134, such as one or more microprocessors, microcontrollers, digital signal processors (DSPs), combinations thereof or such other devices known to those having ordinary skill in the art. The particular operations/functions of processor 134, and respectively thus of base station 132, are determined by an execution of software instructions and routines that are stored in an at least one memory device 136 associated with the processor, such as random access memory (RAM), dynamic random access memory (DRAM), and/or read only memory (ROM) or equivalents thereof, that store data and programs that may be executed by the corresponding processor. Processor 134 further implements a fast scheduler based on instructions maintained in the associated at least one memory device 136 that allocates one or more sub-channels, data rates, and coding and modulation schemes to each subscriber station (SS) serviced by the transceiver based on channel condition measurements, preferably Channel Quality Information (CQI) measurements.

Figure 2:
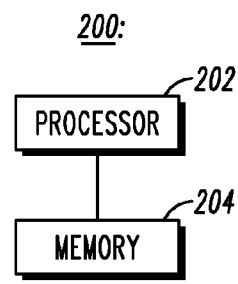
FIG. 2 is a block diagram of a subscriber station (SS) in accordance with an embodiment of the present invention.

FIG. 2 is a block diagram of a subscriber station (SS) 200, such as SSs 101-115, in accordance with an embodiment of the present invention. SS 200 includes a processor 202, such as one or more microprocessors, microcontrollers, digital signal processors (DSPs), combinations thereof or such other devices known to those having ordinary skill in the art. The particular operations/functions of processor 202, and respectively thus of SS 200, is determined by an execution of software instructions and routines that are stored in a respective at least one memory device 204 associated with the processor, such as random access memory (RAM), dynamic random access memory (DRAM), and/or read only memory (ROM) or equivalents thereof, that store data and programs that may be executed by the corresponding processor.

The embodiments of the present invention preferably are implemented within SSs 101-115 and base station 132, and more particularly with or in software programs and instructions stored in the respective at least one memory device 204, 136 of the SSs and base station and respectively executed by the processors 202 and 134. However, one of ordinary skill in the art realizes that the embodiments of the present invention alternatively may be implemented in hardware, for example, integrated circuits (ICs), application specific integrated circuits (ASICs), and the like, such as ASICs implemented in one or more of SSs 101-115 and base station 132. Based on the present disclosure, one skilled in the art will be readily capable of producing and implementing such software and/or hardware without undo experimentation.

Communication system 100 comprises a wideband packet data communication system that employs an Orthogonal Frequency Division Multiplexing (OFDM) modulation scheme for transmitting data over air interface 110. Preferably, communication system 100 is an Orthogonal Frequency Division Multiple Access (OFDMA) communication system, wherein a frequency bandwidth is split into multiple frequency subcarriers that comprise the physical layer channels over which traffic and signaling channels are transmitted via time slots in a TDM (Time Division Multiplexed) or TDM/FDM (Time Division Multiplexed/Frequency Division Multiplexed) fashion. A user may then be assigned one or more time slots in one or more of the frequency subcarriers for an exchange of bearer information, thereby permitting multiple users to transmit simultaneously on the different set of subcarriers such that each user's transmission is orthogonal to the other users transmissions and thus intra-cell interference is minimized. Further, communication system 100 preferably operates in accordance with the Institute of Electrical and Electronics Engineers (IEEE) 802.16d/e standards, which standards specify mobile broadband wireless access protocols, including radio system parameters and call processing procedures. However, those who are of ordinary skill in the art realize that communication system 100 may operate in accordance with any wireless telecommunication system providing periodic channel quality feedback, such as a 3GPP2 (Third Generation Partnership Project 2) 1X EV-DO (1X Evolution-Data Optimized) or 1XEV-DV (1X Evolution-Data/Voice) communication system, a 3GPP HSDPA (High Speed Downlink Packet Access) communication system, a 3GPP E-UTRA (Evolutionary UMTS Terrestrial Radio Access) communication system, or a Wireless Local Area Network (WLAN) communication system as described by other IEEE 802.xx standards, for example, the 802.11a/HiperLAN2, 802.11g, or other 802.16 standards, or any of multiple proposed ultrawideband (UWB) communication systems.

Figure 3:
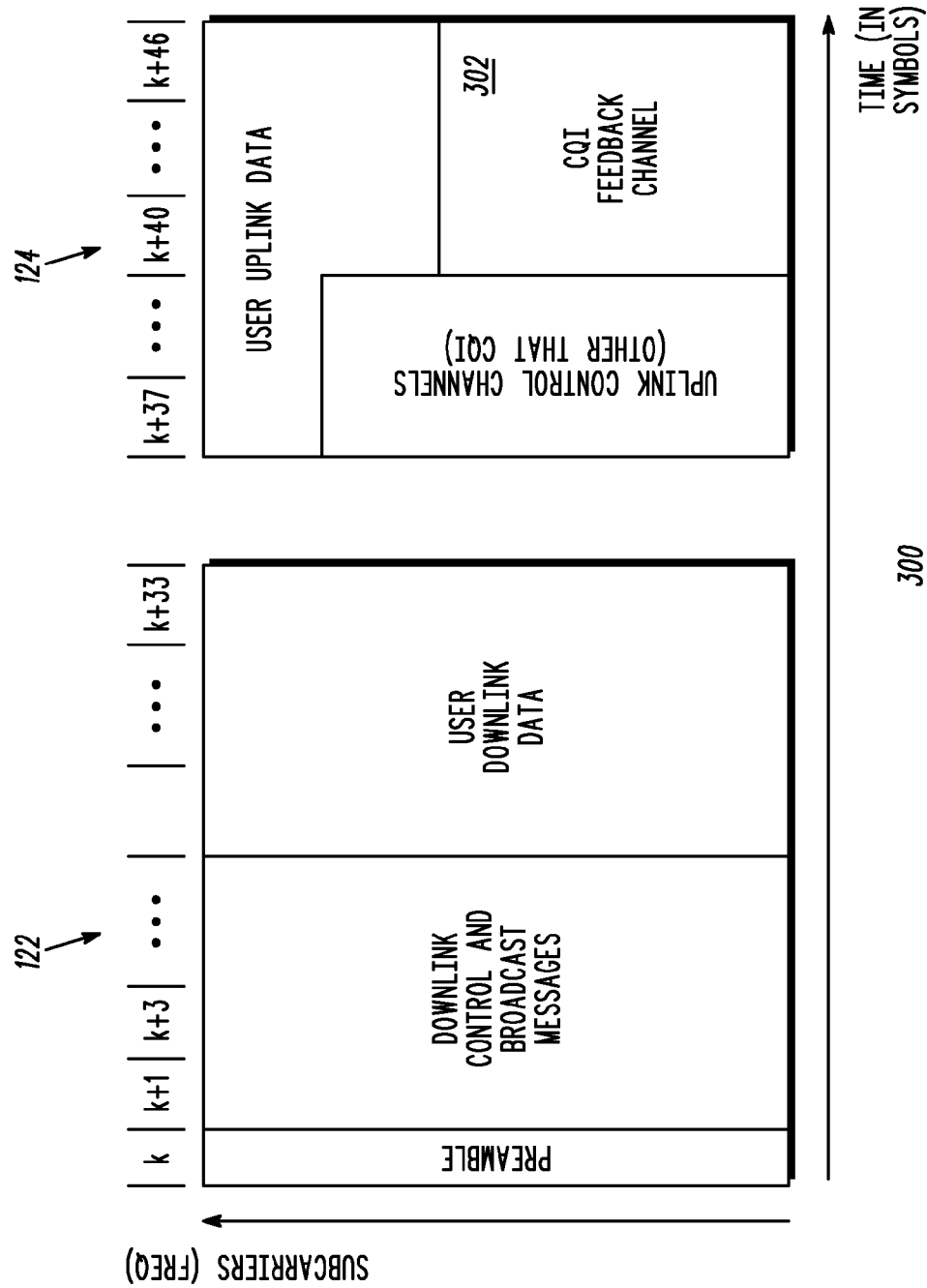
FIG. 3 is an exemplary channel map of the channels of an air interface of FIG. 1 in accordance with an embodiment of the present invention.

Air interface 120 comprises a downlink 122 and an uplink 124. Each of downlink 122 and uplink 124 comprises multiple physical communication channels, including at least one signaling channel and at least one traffic channel. Uplink 124 further includes a channel condition report channel, such as a Channel Quality Information Channel (CQICH), for a conveyance of channel condition reports by SSs to a base station. For example, FIG. 3 depicts an exemplary channel map 300 of the channels of air interface 120, more particularly the downlink 122 and uplink 124 of air interface 120, in accordance with an embodiment of the present invention. The vertical axis of channel map 300 corresponds to a frequency division of air interface 120, and more particularly to the frequency subcarriers associated with air interface 120. The horizontal axis of channel map 300 corresponds to a time division, in OFDM symbols, of air interface 120. The values atop the map, that is, 'k' through 'k+46,' correspond to OFDM symbols allocated to each of the downlink and uplink. Uplink 124 includes a CQICH 302 that comprises multiple subcarriers and multiple OFDM symbols and that is shared among all SSs 101-115 serviced by base station 132. Each SS 101-115 then may be assigned an uplink time slot in CQICH 302, which time slot typically comprises one subchannel and three OFDM symbols in time, for conveyance of CQI measurements to base station 132.

In order to selectively schedule the multiple SSs 101-115 for use of one or more subcarriers of a frequency bandwidth employed by communication system 100, each SS 101-115 reports channel condition information, that is, information concerning a condition of one or more subcarriers, such as CQI, to RAN 130. Based on the reported channel condition information, RAN 130 provides each SS 101-115 with scheduling information for each radio frame. The scheduling information typically includes a two-dimensional region described by OFDMA symbols and allocated subchannels, along with the required modulation and coding scheme. In the prior art, each SS conveys CQI messages at a fixed periodicity or rate, typically every 8 frames, that is, every 40 milliseconds (ms). However, such reporting may consume a significant amount of overhead when there are a large number of reporting SSs. In order to conserve system capacity, communication system 100 provides for dynamically adjusted reporting rates that are based on a detected rate of change of the channel conditions, or CQI.

Figure 4:
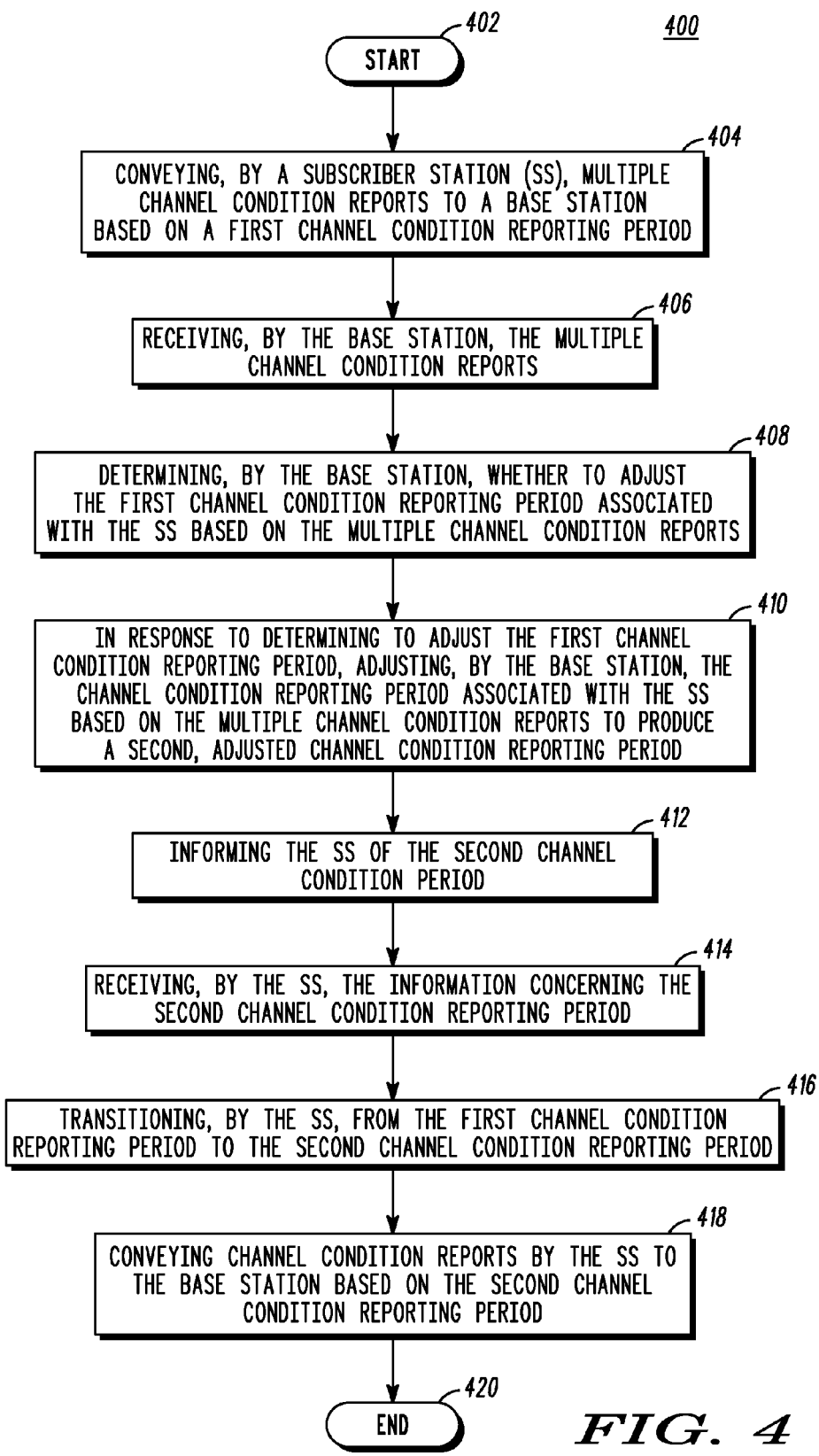
FIG. 4 is a logic flow diagram depicting a control by the communication system of FIG. 1 of a channel condition reporting period for an SS of FIG. 1 in accordance with an embodiment of the present invention.

Referring now to FIG. 4, a logic flow diagram 400 is provided that depicts a control by communication system 100 of a channel condition reporting period for an SS 101-115 in accordance with an embodiment of the present invention. Logic flow 400 begins (402) when an SS, such as SS 101, conveys (404) to base station 132, and the base station receives (406) from the SS, multiple channel condition reports, preferably multiple CQI messages, based on a first channel condition reporting period. Each channel condition report comprises SS measurements of a condition of one or more subcarriers of a given bandwidth, such as a received signal power, a signal-to-noise ratio, a carrier-to-interference ratio, or a carrier power-to-noise power ratio associated with a signal transmitted over a channel utilizing each such subcarrier, or a bit error rate or a frame error rate associated with such signals. One of ordinary skill in the art realizes that many parameters may be measured in determining a channel condition and that any such parameter may be used herein without departing from the spirit and scope of the present invention. Furthermore, although the control of a channel condition reporting period is described herein with respect to SS 101, one of ordinary skill in the art realizes that the method described herein applies equally to a control of a reporting period by each SS 101-115 serviced by base station 132.

In various embodiments of the present invention, SS 101 may convey the multiple channel condition reports periodically or aperiodically based on the first channel condition reporting period. For example, base station 132 may inform SS 101 of the first channel condition reporting period or rate, or SS 101 may be pre-programmed with the first channel condition reporting period or rate. SS 101 then may convey the multiple channel condition measurement messages every such period, or SS 101 may convey the multiple channel condition measurement messages aperiodically based on the first channel condition reporting period, such as only during periods when the channel quality measurements are above a threshold or below another threshold.

Based on the received channel condition reports, base station 132 determines (408) whether to adjust, that is, shorten or lengthen, the first channel condition reporting period associated with SS 101. More particularly, base station 132 determines whether to adjust the first channel condition reporting period for SS 101 based on a detected rate of change of the channel conditions, and preferably in response to a detected change in the rate of change. In response to determining to adjust the first channel condition reporting period, base station 132 adjusts (410) the first channel condition reporting period to produce a second, adjusted channel condition reporting period and conveys (412) to the SS, and the SS receives (414) from the base station, information informing of the second channel condition reporting period. For example, if the rate of change of the channel conditions increases then base station 132 may decrease the reporting period, and if the if the rate of change of the channel conditions decreases then base station 132 may increase the reporting period. In various embodiments of the present invention, the reporting period adjustments may or may not be incremental, for example, where the base station adjusts a reporting period by increasing a reporting period to a next longest reporting period or shortens a reporting period to a next shortest reporting period, and/or may be determined as described below with respect to FIG. 8. However, other algorithms may occur to one of ordinary skill in the art for selecting a new channel condition reporting period, which algorithms may be used herein without departing from the spirit and scope of the present invention.

In response to being informed of the second channel condition reporting period, SS 101 transitions (416) from the first channel condition reporting period to the second channel condition reporting period and begins conveying (418) channel condition reports based on the second channel condition reporting period. In various embodiments of the present invention, SS 101 may convey the channel condition reports periodically or aperiodically based on the second channel condition reporting period. For example, SS 101 may convey the multiple channel condition measurement messages every such period or may convey the multiple channel condition measurement messages only during such periods when the channel quality measurements are above a threshold or below another threshold. Logic flow 400 then ends (420).

Figure 5:
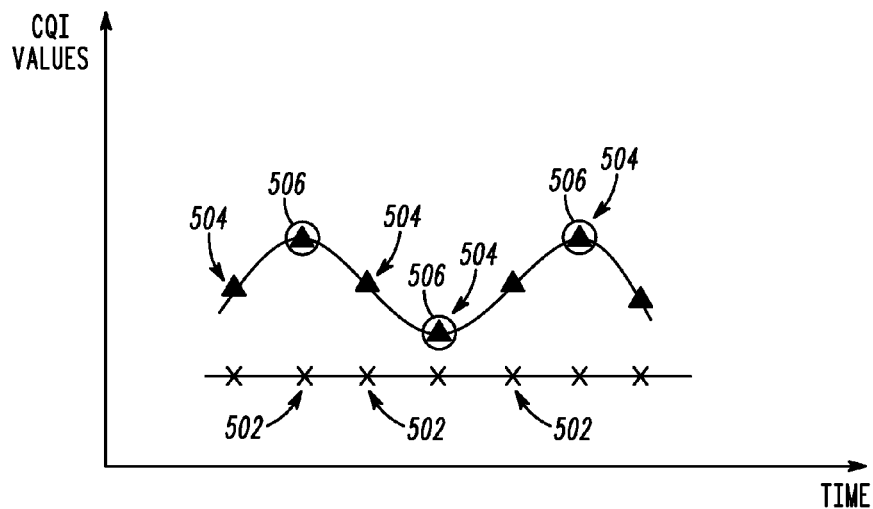
FIG. 5 is an exemplary graphical representation of Channel Quality Information (CQI) values reported by an SS of FIG. 1 in accordance with an embodiment of the present invention.
Figure 6:
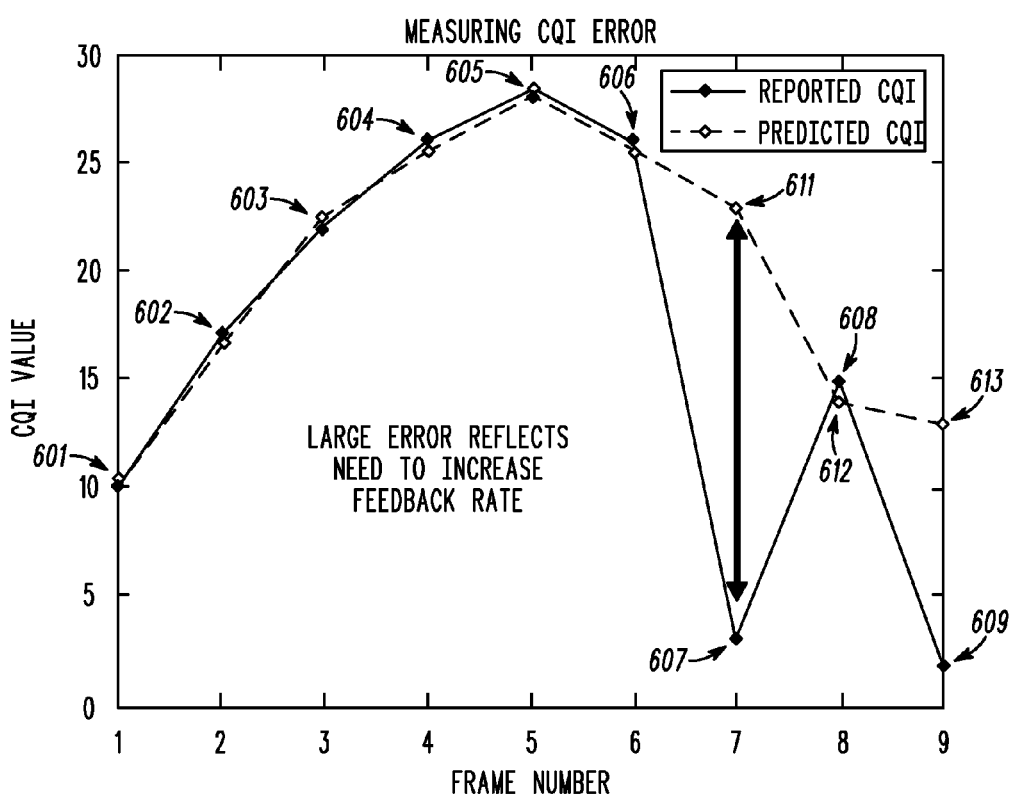
FIG. 6 is an exemplary graphical representation of CQI values reported by an SS of FIG. 1 in accordance with another embodiment of the present invention.

In one embodiment of the present invention, base station 132 may detect a pattern, based on a curve fit, associated with channel condition values previously reported by the SS, such as previously reported CQI. Base station 132 may then adjust the first channel condition reporting period based on the detected pattern or curve fit. For example, FIG. 5 is an exemplary graphical representation of CQI values reported by an SS, such as SS 101, in accordance with an embodiment of the present invention. Suppose multiple consecutive CQI values reported by the SS during previous reporting periods are approximately the same, which reported CQI values are represented in FIG. 5 by points marked with an 'x' 502. Typically, CQI values range from '0' to '31.' In an instance of generally unvarying CQIs, the CQI reporting period may be reduced. By way of another example, suppose previously reported CQI values 504 vary and map to a curve of frequency 'i,' which reported CQI values are represented in FIG. 5 by points marked with a 'Δ.' In such an instance, the CQI reporting period may be reduced, for example, to a period corresponding to the circled points 506.

In another embodiment of the present invention, in response to determining a curve fit in association with the previously reported channel condition values, base station 132 may forecast, based on the curve fit, a future channel condition value. Base station 132 then may receive a report of a measured channel condition value that corresponds to a value that had been forecast, compare the measured channel condition value to the forecast value, and determine whether to adjust the first channel condition reporting period based on the comparison. For example, referring now to FIG. 6, an exemplary graphical representation 600 of CQI values reported by an SS, such as SS 101, is depicted in accordance with another embodiment of the present invention. A curve is fit to CQI values 601-606 reported during six reporting periods. Based on the curve, a seventh CQI value 611, an eighth CQI value 612, and a ninth CQI value 613, corresponding to a seventh, eighth, and ninth reporting period, are predicted. When measured CQI values 607-609 are reported to base station 132 with respect to the seventh, eighth, and ninth reporting periods, the base station compares one or more of the measured CQI values 607-609 to the corresponding predicted CQI value(s) 611-613 and determines, based on the comparison, whether to adjust the channel condition reporting period. For example, base station 132 may determine a prediction error associated with each CQI report based on a difference between the reported CQI value and the corresponding predicted CQI value, compare the prediction error to a prediction error threshold, and determine whether to adjust the channel condition reporting period based on the comparison, for example, determining to adjust the channel condition reporting period when the prediction error exceeds the prediction error threshold. In order to avoid adjustments based on outliers, or a ping pong of adjustments, base station 132 may further maintain, in the at least one memory device 136 of the base station, a prediction error count threshold and a count of a number of prediction errors that exceed the prediction error threshold. When the count exceeds the prediction error count threshold within a predetermined period of time or during the course of a predetermined number of channel condition reports, then base station 132 may determine to adjust the channel condition reporting period.

Figure 7:
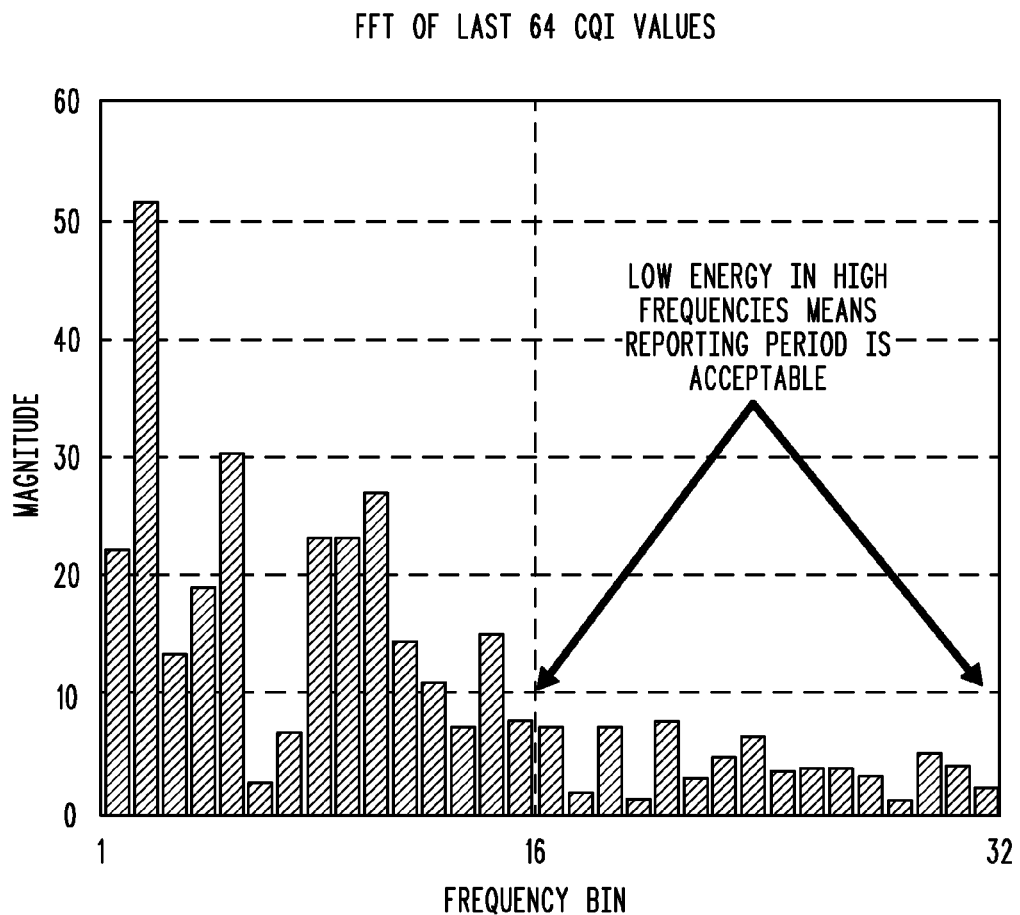
FIG. 7 is an exemplary frequency domain analysis is provided of multiple CQI values reported by an SS of FIG. 1 in accordance with another embodiment of the present invention.

In yet another embodiment of the present invention, base station 132 may determine whether to adjust the first channel condition reporting period based on a spectrum analysis, that is, a frequency domain analysis, of previously reported channel condition values, such as previously reported CQI values. For example, referring now to FIG. 7, an exemplary spectrum analysis 700 is provided of multiple received CQI values in accordance with an embodiment of the present invention. More particularly, spectrum analysis 700 is based on an application of a Fast Fourier Transform (FFT) to 64 CQI values. The horizontal axis corresponds to frequency and comprises units of frequency bands, which bands are represented by bins. The horizontal axis corresponds to a magnitude of a frequency component associated with a corresponding frequency bin. In FIG. 7, the high frequency components of the spectrum analysis of the CQI values are arbitrarily determined to be represented by bins 16 and above. Low energies (low magnitudes) associated with the high frequency components may be interpreted as indicating that the fluctuations in CQI values are acceptably periodic. In such an instance, the channel condition reporting period may be determined to be acceptable. Such is a plausible interpretation of the spectrum depicted in FIG. 7. When the high frequency components are associated with high energy values, for example, if the magnitude values associated with each bin in FIG. 7 were flipped around a vertical axis such that the magnitude corresponding to bin 1 instead corresponded to bin 32, the magnitude corresponding to bin 2 instead corresponded to bin 31, the magnitude corresponding to bin 3 instead corresponded to bin 30, and so on, that may indicate an aperiodic nature of the reported CQI values and may further indicate an unacceptability of, and a desirableness to adjust, or shorten, the channel condition reporting period.

Figure 8:
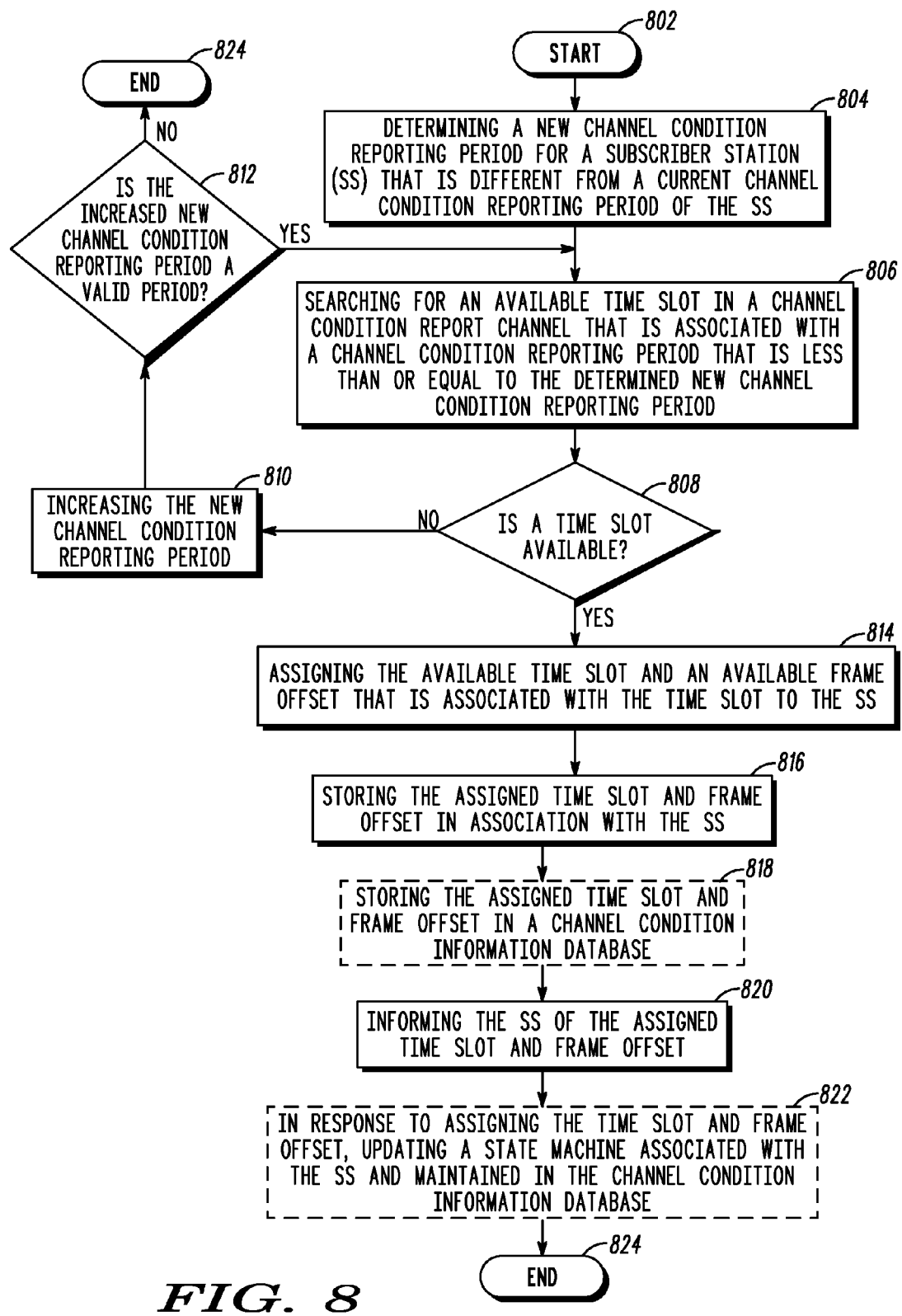
FIG. 8 is a logic flow diagram that depicts a method for adjusting, by a base station of FIG. 1, a channel condition reporting period for an SS of FIG. 1 in accordance with an embodiment of the present invention.

Referring now to FIG. 8 a logic flow diagram 800 is provided that depicts a method for adjusting, by base station 132, a channel condition reporting period for an SS in accordance with an embodiment of the present invention. Logic flow diagram 800 begins (802) when base station 132 determines (804) a new channel condition reporting period associated with an SS that is different than a channel condition reporting period currently in use by, and/or associated with, the SS. Base station 132 then searches (806) for an available time slot in a channel condition report channel, such as a CQICH, of uplink 124 associated with a channel condition reporting period that is less than or equal to the determined new channel condition reporting period.

For example, FIG. 9 depicts an exemplary channel condition reporting schedule table 900 in accordance with an embodiment of the present invention. Preferably, channel condition reporting schedule table 900 is maintained in the at least one memory device 136 of base station 132. As depicted in FIG. 9, the channel condition report channel comprises multiple time slots (four shown, that is, time slots 0-3). Each time slot of the multiple time slots 0-3 corresponds to a different channel condition reporting period. For example, a first time slot of the multiple time slots 0-3, that is, time slot 0, corresponds to a shortest channel condition reporting period, wherein an SS reports measured channel conditions every channel condition reporting channel frame. A second time slot of the multiple time slots 0-3, that is, time slot 1, corresponds to a next shortest channel condition reporting period, wherein an SS reports measured channel conditions every other channel condition report channel frame. A third time slot of the multiple time slots 0-3, that is, time slot 2, corresponds to a second longest channel condition reporting period, wherein an SS reports measured channel conditions every fourth channel condition report channel frame. And a fourth time slot of the multiple time slots 0-3, that is, time slot 3, corresponds to a longest channel condition reporting period, wherein an SS reports measured channel conditions every eighth channel condition report channel frame. Channel condition reporting schedule table 900 is populated whenever an SS is initially assigned a channel condition reporting period, that is, is assigned a time slot and a frame offset for a reporting of channel condition measurements. Such initial assignments are up to a designer of communication system 100 and may be aggressive, that is, assigning a time slot with an available frame offset that is furthest to the left in table 900, may be conservative, that is, assigning a time slot with an available frame offset that is furthest to the right in table 900, or may vary based upon any one of many assignment algorithms that may occur to one of ordinary skill in the art.

As depicted in table 900, SS 101 is assigned time slot 0, which time slot has a reporting period of one channel condition report channel frame. SSs 102 and 105 are assigned to share time slot 1, which time slot has a reporting period of two channel condition report channel frames (that is, each SS only reports every other frame). Further, SS 105 is assigned a frame offset of one frame, so that SSs 102 and 105 alternate transmitting channel condition report channel frames. SSs 103, 106, 108, and 110 are assigned to share time slot 2, which time slot has a reporting period of four channel condition report channel frames (that is, each SS only reports every fourth frame), where SS 106 is assigned a frame offset of one frame, SS 108 is assigned a frame offset of two frames, and SS 110 is assigned a frame offset of three frames. Finally, SSs 104, 107, 109, and 111-115 are assigned to share time slot 3, which time slot has a reporting period of eight channel condition report channel frames (that is, each SS only reports every eighth frame). In addition, SS 107 is assigned a frame offset of one frame, SS 109 is assigned a frame offset of two frames, and SS 111 is assigned a frame offset of three frames, SS 112 is assigned a frame offset of four frame, SS 113 is assigned a frame offset of five frames, SS 114 is assigned a frame offset of six frames, and SS 115 is assigned a frame offset of seven frames.

When base station 132 searches for an available time slot in a channel condition report channel, such as a CQICH, of uplink 124 associated with a channel condition reporting period, the base station searches the table from left to right, that is, from time slots associated with the shortest reporting period to the time slots associated with the longest reporting period, to see if a time slot is available. If no time slots are available (808) that are less than or equal to the determined new channel condition reporting period, then base station 132 increases (810) the determined new channel condition reporting period and determines (812) if the increased new reporting period is a valid reporting period (no longer than 8 frames with respect to FIG. 9). If the increased new reporting period is a valid reporting period, then base station 132 returns to step 806. If the new reporting period is not a valid reporting period, then logic flow diagram 800 ends (824).

If a time slot is available (808) that is less than or equal to the determined new channel condition reporting period, base station 132 assigns (814) the available time slot and an available frame offset associated with the available time slot to the SS and stores (816), in the at least one memory device 136 of the base station and in association with the time slot and the frame offset, an identifier associated with the SS, such as a Subscriber Identification Number (SSID). For example, base station 132 may store the SS identifier in an appropriate slot in table 900. Base station 132 may further store (818) the offset and an associated frame number in a channel condition information database 138 included in the at least one memory device 136, preferably a CQI database. Base station 132 then informs (820) the SS of the assigned time slot and frame offset, preferably by informing the SS of the time slot, a frame to start reporting in the assigned time slot, and a reporting period. Base station 132 may further inform the SS of how long to continue reporting channel condition measurements. For example, if the channel condition reports comprise CQI messages and the channel condition report channel comprises a CQICH, base station 132 may convey a modified version of a CQICH_ALLOC_IE message to the SS, which message is modified to include information concerning a selected time slot, a frame to start reporting in the selected time slot, a reporting period, and how long to continue reporting.

Figure 10:
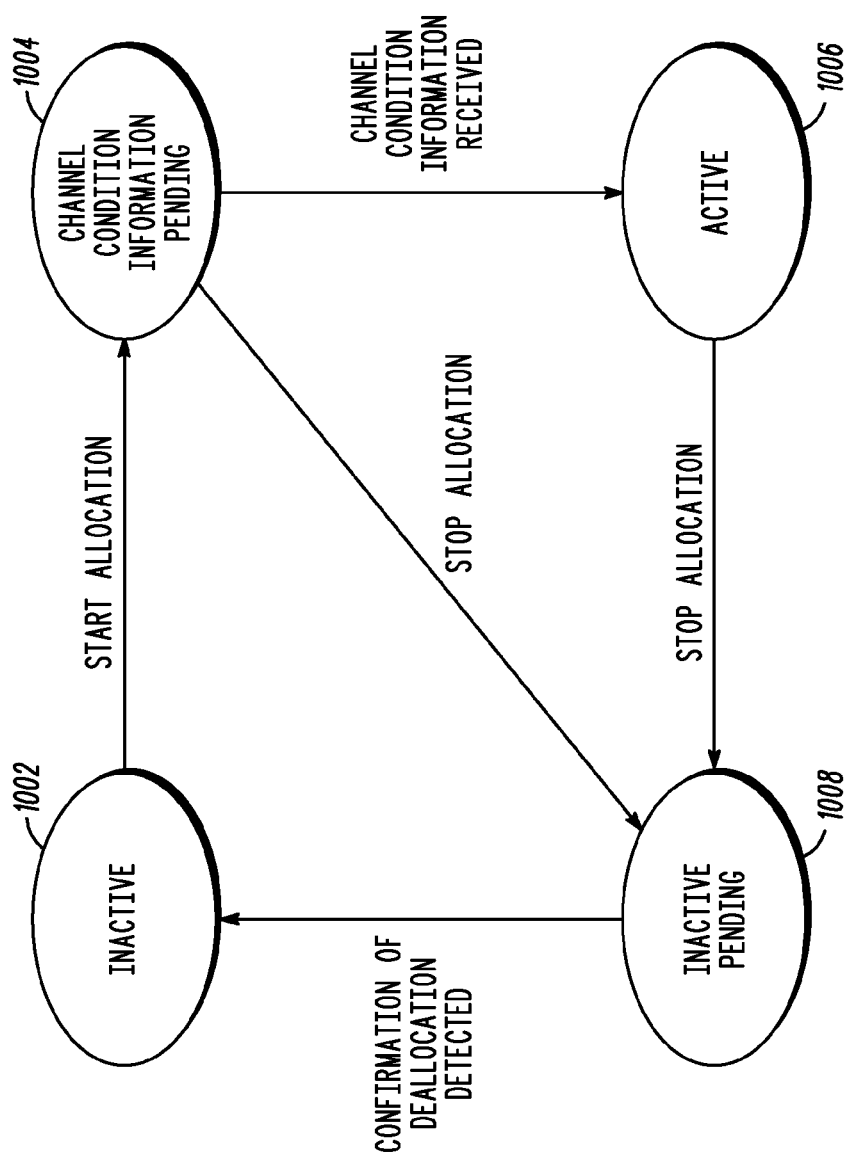
FIG. 10 depicts an exemplary state machine that may be maintained by a base station of FIG. 1 in accordance with an embodiment of the present invention.

Further, in response to assigning the time slot and an available frame offset to the SS, base station 132 may update (822) a state machine maintained in channel condition information database 138 in association with the SS, and logic flow 800 then ends (824). For example, FIG. 10 depicts an exemplary state machine 1000 that may be maintained by base station 132 in at least one memory device 136, and more particularly in channel condition information database 138, in accordance with an embodiment of the present invention. State machine 1000 includes four states of an SS, that is, an inactive state 1002, a channel condition information pending state 1004, an active state 1006, and an inactive pending state 1008. An SS that has not been assigned a time slot in a channel condition report channel for a reporting of channel condition information is maintained in inactive state 1002. When base station 132 assigns, to the SS, a time slot in the channel condition report channel (but has not yet received a valid channel condition report from the SS), the base station transitions the SS to channel condition information pending state 1004. When base station 132 receives a valid channel condition report from the SS, the base station transitions the SS to active state 1006. Base station 132 then maintains the SS in active state 1006 so long as channel condition information reports are scheduled for the SS. When base station 132 terminates an allocation of a time slot in the channel condition report channel to the SS and conveys a deallocation message to the SS, the base station transitions the SS to inactive pending state 1008. However, channel condition reports may be received from an SS that has been transitioned to the inactive pending state as the SS may not yet have received and processed the deallocation message. In response to receiving the deallocation message, the SS conveys a confirmation of the deallocation, such as a DTX message, to base station 132. In response to receiving the confirmation, the base station transitions the SS to inactive state 1002.

In summarization, a wireless communication system that provides periodic channel quality feedback adjusts a channel condition reporting period for a subscriber station (SS) based on multiple channel condition information reports, such as CQI messages, received from the SS. By adjusting the channel condition reporting period for the SS based on measured channel conditions, the communication system dynamically attains a balance between reducing channel condition report overhead, such as CQI message overhead, for example, when frequent reports are not needed, and providing channel condition reports with sufficient frequency that the precision and reliability required to make optimal scheduling choices is met.

In various embodiments of the present invention, the communication system, and more particularly a base station serving the SS, may adjust the channel condition reporting period based on a pattern associated with the received channel condition values, a comparison of a predicted channel condition value and a corresponding measured channel condition value, and/or a spectrum analysis of the multiple channel condition values. In other embodiments of the present invention, the communication system may adjust the channel condition reporting period by determining a new channel condition reporting period that is different than the channel condition reporting period currently in use by the SS and assigning to the SS a time slot, and a frame offset that is associated with the assigned time slot, in a channel condition reporting channel, such as a CQICH, wherein the time slot is associated with a channel condition reporting period that is less than or equal to the determined new channel condition reporting period.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits to problems have been described above with regard to specific embodiments. However, the benefits, advantages, solutions to problems, and any element(s) that may cause any benefit, advantage, or solution to occur or become more pronounced are not to be construed as a critical, required, or essential feature of elements of any or all the claims. As used herein, the terms "comprises," "comprising," or any variation thereof, are intended to cover a non-exclusive inclusion, such that a process, method article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for adjusting a channel condition reporting period in a wireless communication system, the method comprising:
   receiving a plurality of channel condition information reports from a subscriber station based on a channel condition reporting period; and
   adjusting the channel condition reporting period for the subscriber station based on the plurality of received channel condition information reports to produce an adjusted channel condition reporting period.

2. The method of claim 1 further comprising informing the subscriber station of the adjusted channel condition reporting period.

3. The method of claim 1, wherein adjusting comprises:
   determining a predicted channel condition value based on the plurality of received channel condition information reports;
   determining a corresponding measured channel condition value; and
   adjusting the channel condition reporting period for the subscriber station based on the predicted channel condition value and the corresponding measured channel condition value.

4. The method of claim 3, wherein adjusting further comprises:
   comparing the predicted channel condition value to the corresponding measured channel condition value; and
   adjusting the channel condition reporting period for the subscriber station based on the comparison.

5. The method of claim 3, wherein adjusting further comprises:
   comparing the predicted channel condition value to the corresponding measured channel condition value to produce a prediction error;
   comparing the prediction error to a prediction error threshold; and
   adjusting the channel condition reporting period for the subscriber station based on the comparison of the prediction error to the prediction error threshold.

6. The method of claim 1, wherein the plurality of channel condition information reports comprise a plurality of channel condition values and wherein adjusting comprises:
   performing a spectrum analysis of the plurality of channel condition values; and
   adjusting the channel condition reporting period for the subscriber station based on the spectrum analysis.

7. The method of claim 1, wherein adjusting comprises:
   determining a new channel condition reporting period that is different than the channel condition reporting period currently in use by the subscriber station;
   assigning, to the subscriber station, a time slot in a channel condition reporting channel, wherein the time slot is associated with a channel condition reporting period that is less than or equal to the determined new channel condition reporting period; and
   informing the subscriber station of the assigned time slot.

8. The method of claim 7, further comprising:
   assigning, to the subscriber station, a frame offset that is associated with the assigned time slot; and
   informing the subscriber station of the assigned frame offset.

9. The method of claim 1, further comprising:
   maintaining a state machine in a channel condition information database and in association with the subscriber station;
   updating the state machine in response to one or more of informing the subscriber station of a time slot assigned for conveyance of channel condition reports, receiving a channel condition report from the subscriber station, terminating an allocation of a time slot for conveyance of channel condition reports, and receiving a confirmation of a receipt of the termination.

10. The method of claim 1, wherein the channel condition reporting period comprises a period provided for a reporting of measured Channel Quality Information (CQI) values.

11. A base station that is configured to control a channel condition reporting period in a wireless communication system, wherein the base station comprises a processor that is configured to receive a plurality of channel condition information reports from a subscriber station based on a channel condition reporting period and adjust the channel condition reporting period for the subscriber station based on the plurality of received channel condition information reports to produce an adjusted channel condition reporting period.

12. The base station of claim 11, wherein the processor is configured to inform the subscriber station of the adjusted channel condition reporting period.

13. The base station of claim 11, wherein the processor is configured to adjust a channel condition reporting period by determining a predicted channel condition value based on the plurality of received channel condition information reports, determining a corresponding measured channel condition value, and adjusting the channel condition reporting period for the subscriber station based on the predicted channel condition value and the corresponding measured channel condition value.

14. The base station of claim 13, wherein the processor is configured to adjust a channel condition reporting period by comparing the predicted channel condition value to the corresponding measured channel condition value and adjusting the channel condition reporting period for the subscriber station based on the comparison.

15. The base station of claim 13, wherein the processor is configured to adjust a channel condition reporting period by comparing the predicted channel condition value to the corresponding measured channel condition value to produce a prediction error, comparing the prediction error to a prediction error threshold, and adjusting the channel condition reporting period for the subscriber station based on the comparison of the prediction error to the prediction error threshold.

16. The base station of claim 11, wherein the plurality of channel condition information reports comprise a plurality of channel condition values and wherein the processor is configured to adjust the channel condition reporting period by performing a spectrum analysis of the plurality of channel condition values and adjusting the channel condition reporting period for the subscriber station based on the spectrum analysis.

17. The base station of claim 11, wherein the processor is configured to adjust a channel condition reporting period by determining a new channel condition reporting period that is different than the channel condition reporting period currently in use by the mobile station, assigning, to the subscriber station, a time slot in a channel condition reporting channel, wherein the time slot is associated with a channel condition reporting period that is less than or equal to the determined new channel condition reporting period, and informing the subscriber station of the assigned time slot.

18. The base station of claim 17, wherein the processor further is configured to assign, to the subscriber station, a frame offset that is associated with the assigned time slot and inform the subscriber station of the assigned frame offset.

19. The base station of claim 11, wherein the base station further comprises an at least one memory device that maintains a state machine in association with the subscriber station and wherein the processor is configured to update the state machine in response to one or more of informing the subscriber station of a time slot assigned for conveyance of channel condition reports, receiving a channel condition report from the subscriber station, terminating an allocation of a time slot for conveyance of channel condition reports, and receiving a confirmation of a receipt of the termination.

20. The base station of claim 11, wherein the channel condition reporting period comprises a period provided for a reporting of measured Channel Quality Information (CQI) values.

21. A subscriber station that is configured to convey a plurality of a plurality of channel condition information reports to a base station based on a first channel condition reporting period, in response to conveying the plurality of channel condition information reports, receive information informing of a second channel condition reporting period that is different than the first channel condition reporting period, and, in response to receiving the information concerning the second channel condition reporting period, convey a channel condition report based on the second channel condition reporting period.

* * * * *